(12) United States Patent
Yoshida

(10) Patent No.: US 10,712,605 B2
(45) Date of Patent: Jul. 14, 2020

(54) LIQUID CRYSTAL DISPLAY DEVICE

(71) Applicant: SAKAI DISPLAY PRODUCTS CORPORATION, Sakai-shi, Osaka (JP)

(72) Inventor: Yukio Yoshida, Sakai (JP)

(73) Assignee: SAKAI DISPLAY PRODUCTS CORPORATION, Sakai-shi, Osaka (JP)

( * ) Notice: Subject to any disclaimer, the term of this patent is extended or adjusted under 35 U.S.C. 154(b) by 0 days.

(21) Appl. No.: 16/488,780

(22) PCT Filed: Feb. 28, 2017

(86) PCT No.: PCT/JP2017/007867
§ 371 (c)(1),
(2) Date: Aug. 26, 2019

(87) PCT Pub. No.: WO2018/158834
PCT Pub. Date: Sep. 7, 2018

(65) Prior Publication Data
US 2020/0110293 A1    Apr. 9, 2020

(51) Int. Cl.
*G02F 1/1335* (2006.01)
*G02F 1/1339* (2006.01)
*G02F 1/1333* (2006.01)

(52) U.S. Cl.
CPC .... *G02F 1/133512* (2013.01); *G02F 1/13394* (2013.01); *G02F 1/133305* (2013.01);
(Continued)

(58) Field of Classification Search
None
See application file for complete search history.

(56) References Cited

U.S. PATENT DOCUMENTS

| | | | |
|---|---|---|---|
| 10,101,607 B2 * | 10/2018 | Lee | G02F 1/133514 |
| 2008/0137013 A1 * | 6/2008 | Kamoshida | G02F 1/133305 |
| | | | 349/106 |

(Continued)

*Primary Examiner* — Edward J Glick
*Assistant Examiner* — Mark D Teets
(74) *Attorney, Agent, or Firm* — ScienBiziP, P.C.

(57) ABSTRACT

A liquid crystal display apparatus according to an embodiment of the present invention includes a first substrate, a second substrate, and a liquid crystal layer, and has a display region defined by a plurality of pixels. The first substrate has a pixel electrode provided in each of the plurality of pixels. The second substrate has a first, a second, and a third color filter having a striped pattern extending in a first direction, and a light blocking layer. The display region includes a first and a second region spaced apart from each other in a second direction generally perpendicular to the first direction, and a third region located between the first and second regions and including the center of the display region. The light blocking layer includes, in each of the first, second, and third regions, a plurality of first light blocking portions extending in the first direction, and a plurality of second light blocking portions extending in the second direction. In each of the first and second regions, a width of the first light blocking portion is greater than a width of each of the plurality of second light blocking portions. In the third region, a width of the second light blocking portion is greater than a width of the first light blocking portion.

12 Claims, 7 Drawing Sheets

(a)

(b)

(52) U.S. Cl.
CPC .............. *G02F 2001/13396* (2013.01); *G02F 2001/133388* (2013.01); *G02F 2201/40* (2013.01)

(56) References Cited

U.S. PATENT DOCUMENTS

| | | | |
|---|---|---|---|
| 2014/0092350 A1 | 4/2014 | Byeon et al. | |
| 2015/0362796 A1* | 12/2015 | Kong | G02F 1/136286 349/106 |
| 2015/0370121 A1* | 12/2015 | Wu | G02F 1/133514 349/106 |
| 2016/0041443 A1* | 2/2016 | Wu | G02F 1/136286 349/43 |
| 2016/0274420 A1* | 9/2016 | Oh | G02F 1/133512 |
| 2018/0031906 A1* | 2/2018 | Park | G02F 1/133512 |
| 2019/0377220 A1* | 12/2019 | Ohhitsu | G02F 1/136286 |
| 2020/0041835 A1* | 2/2020 | Asamizu | G02F 1/133514 |

\* cited by examiner

FIG.7 (a) (b)
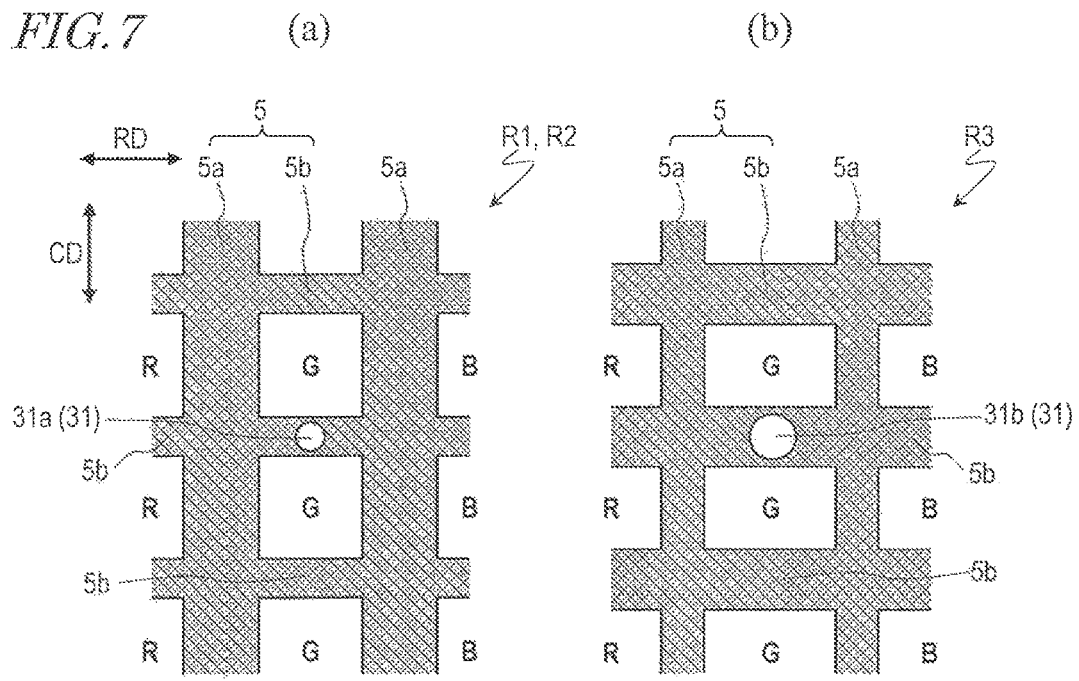
FIG.8
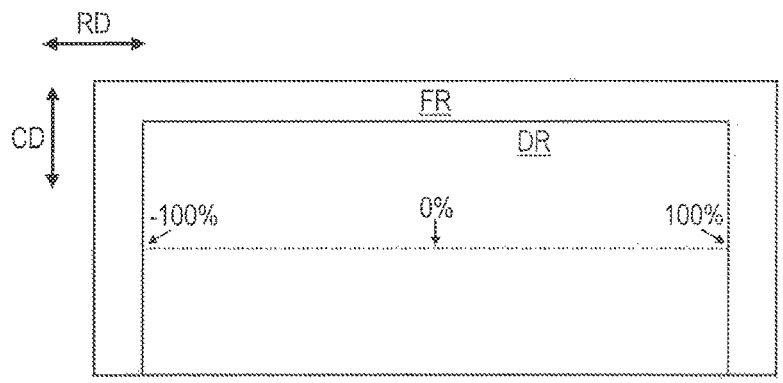
FIG.9
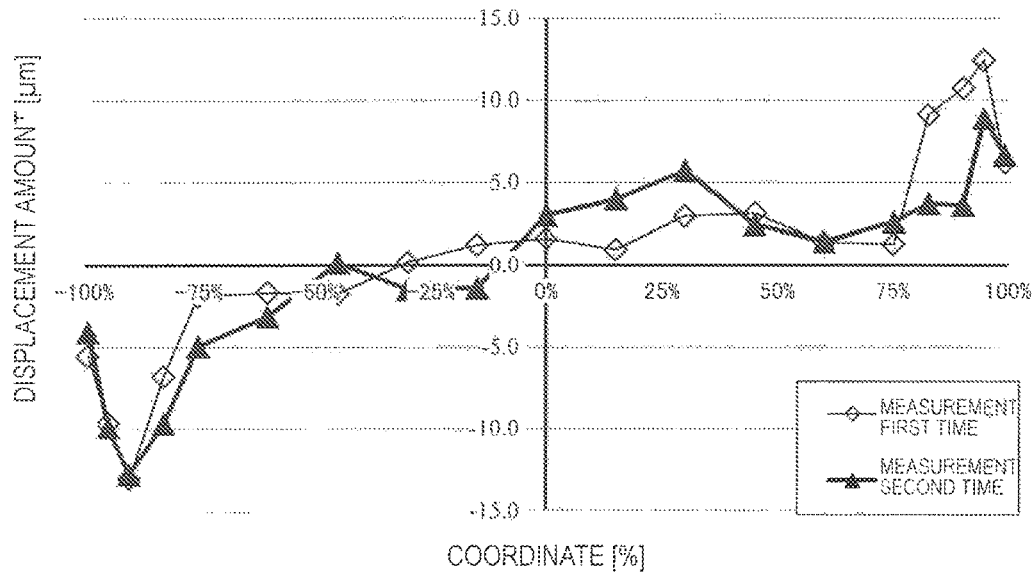

FIG.12
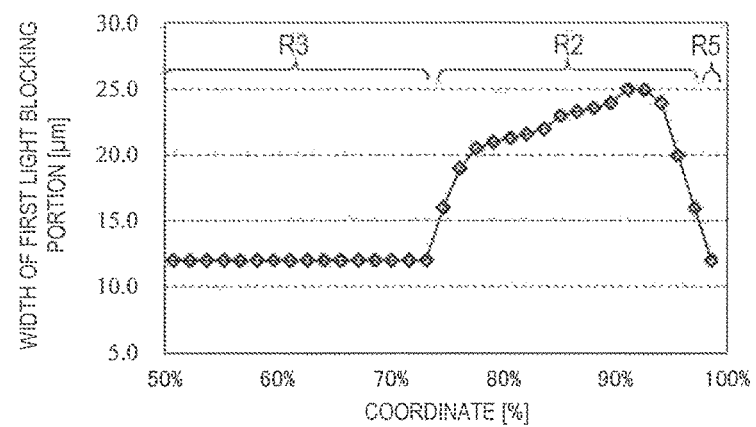
(a)
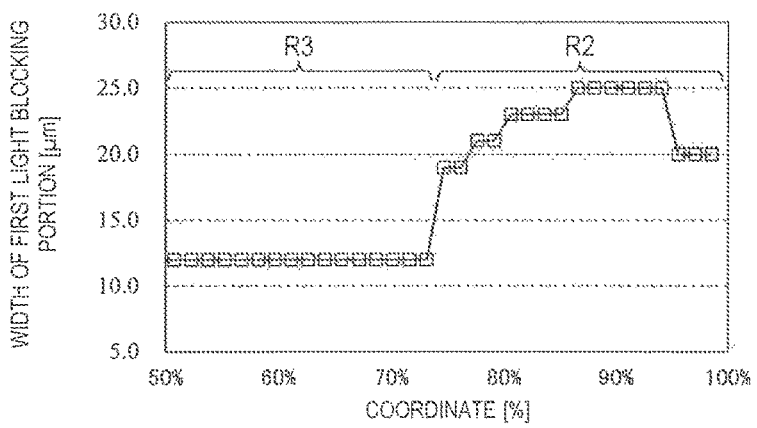
(b)
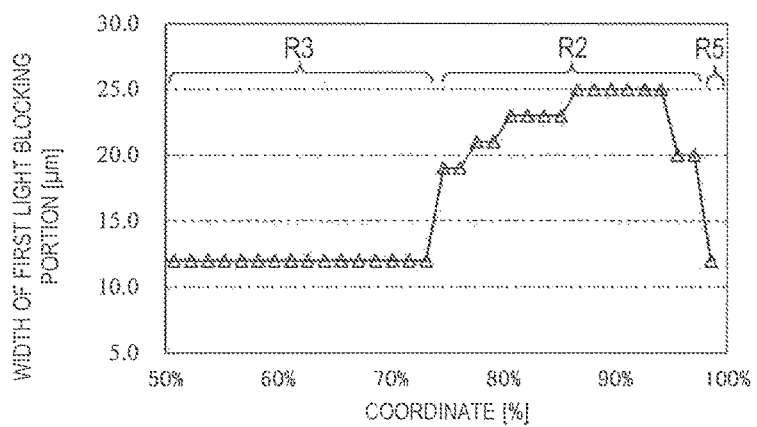
(c)
FIG.13
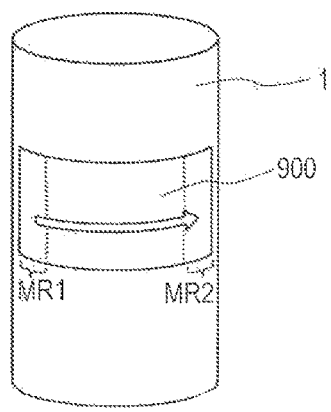

LIQUID CRYSTAL DISPLAY DEVICE

TECHNICAL FIELD

The present invention relates to liquid crystal display apparatuses.

BACKGROUND ART

Liquid crystal display apparatuses, which have the advantage of being thin and consuming little power, have in recent years been widely used in information apparatuses such as notebook personal computers, mobile telephones, and electronic organizers, or camcorders with a liquid crystal monitor, and the like. The definition and screen size of liquid crystal display apparatuses have been significantly increased, and at present, most of the television sets are liquid crystal televisions.

Among other applications of liquid crystal display apparatuses is digital signage (electronic billboards). As a new form of digital signage, a style has been proposed in which a flexible liquid crystal display apparatus (liquid crystal panel) is wrapped around a circular column. FIG. 13 shows such a digital signage style. As shown in FIG. 13, a liquid crystal panel 900 is attached to a circular column 1 with the panel curved. In that state, the display surface of the liquid crystal panel 900 is a curved surface having a great curvature, and therefore, the display can be appropriately viewed from various directions. A liquid crystal display apparatus that can perform displaying with the apparatus curved is disclosed in, for example, Patent Document 1.

CITATION LIST

Patent Literature

Patent Document No. 1: US Laid-Open Patent Publication No. 2014/0092350

SUMMARY OF INVENTION

Technical Problem

However, when the liquid crystal panel 900 is curved at a great curvature, color mixture occurs in a region MR1 at or near the left end of the display region and a region MR2 at or near the right end of the display region (i.e., outer regions in the circumferential direction of the curved surface). Such color mixture occurs due to a displacement between the active matrix substrate and the color filter substrate due to the curving of the liquid crystal panel 900.

FIG. 14 is a cross-sectional view showing the liquid crystal panel 900 in a curved state. When the liquid crystal panel 900 is curved, a difference in the radius of curvature occurs between an active matrix substrate 910 and a color filter substrate 920 due to the thickness of the liquid crystal panel 900 itself. Therefore, as shown in FIG. 14, a force is applied to the active matrix substrate 910 such that the active matrix substrate 910 may be displayed outward, and a force is applied to the color filter substrate 920 such that the color filter substrate 920 may be displaced inward. As a result, a displacement occurs between the active matrix substrate 910 and the color filter substrate 920. The displacement of the two substrates causes, for example, the green color filter to enter a region corresponding to a red pixel (i.e., the green color filter overlaps the pixel electrode of the red pixel). In such a case, a portion of light modulated by the liquid crystal layer of the red pixel passes through the green color filter, so that the monochromatic display of red becomes yellowish.

Note that Patent Document 1 discloses a structure in which the height, distribution density, and the like of columnar spacers are varied in the display region, whereby variations in cell gap (the thickness of the liquid crystal layer) due to the curving are inhibited. However, Patent Document 1 does not mention the above occurrence of color mixture, and of course, in the liquid crystal display apparatus of Patent Document 1, no measures are taken against the occurrence of color mixture.

With the above problem in mind, the present invention has been made. It is an object of the present invention to provide a liquid crystal display apparatus in which the occurrence of color mixture is inhibited even when the liquid crystal display apparatus is curved with a relatively great curvature.

Solution to Problem

A liquid crystal display apparatus according to an embodiment of the present invention includes a first substrate, a second substrate facing the first substrate, and a liquid crystal layer provided between the first and second substrates. The liquid crystal display apparatus has a display region defined by a plurality of pixels. The first substrate has a pixel electrode provided in each of the plurality of pixels. The second substrate has a first, a second, and a third color filter having different colors and having a striped pattern extending in a first direction, and a light blocking layer. The display region includes a first and a second region spaced apart from each other in a second direction generally perpendicular to the first direction, and a third region located between the first and second regions and including the center of the display region. The light blocking layer includes, in each of the first, second, and third regions, a plurality of first light blocking portions extending in the first direction, and a plurality of second light blocking portions extending in the second direction. In each of the first and second regions, a width of each of the plurality of first light blocking portions is greater than a width of each of the plurality of second light blocking portions. In the third region, a width of each of the plurality of second light blocking portions is greater than a width of each of the plurality of first light blocking portions.

In one embodiment, the first, second, and third regions have substantially the same pixel aperture ratio.

In one embodiment, a length in the second direction of each of the first and second regions is smaller than a length in the second direction of the third region.

In one embodiment, a length in the second direction of each of the first and second regions is 10-20% of a length in the second direction of the display region.

In one embodiment, in each of the first and second regions, the plurality of first light blocking portions have substantially the same width.

In one embodiment, in each of the first and second regions, the plurality of first light blocking portions include two or more first light blocking portions having different widths.

In one embodiment, the display region further includes a fourth region located on the opposite side of the first region from the third region, and a fifth region located on the opposite side of the second region from the third region. In each of the fourth and fifth regions, a width of each of the plurality of first light blocking portions is smaller than or equal to a width of each of the plurality of second light blocking portions.

In one embodiment, a length in the second direction of each of the fourth and fifth regions is smaller than a length in the second direction of each of the first and second regions.

In one embodiment, the liquid crystal display apparatus further includes a plurality of columnar spacers provided between the first and second substrates, and defining a thickness of the liquid crystal layer. The plurality of columnar spacers include a first columnar spacer disposed overlaying one of the plurality of second light blocking portions in each of the first and second regions, and a second columnar spacer disposed overlaying one of the plurality of second light blocking portions in the third region. An area of the second columnar spacer is larger than an area of the first columnar spacer when the first and second columnar spacers are viewed in a layer normal direction of the liquid crystal layer.

Another liquid crystal display apparatus according to an embodiment of the present invention includes a first substrate, a second substrate facing the first substrate, and a liquid crystal layer provided between the first and second substrates. The liquid crystal display apparatus has a display region defined by a plurality of pixels. The first substrate has a pixel electrode provided in each of the plurality of pixels. The second substrate has a first, a second, and a third color filter having different colors and having a striped pattern extending in a first direction. The first or second substrate has a light blocking layer. The display region includes a first and a second region spaced apart from each other in a second direction generally perpendicular to the first direction, and a third region located between the first and second regions and including the center of the display region. The light blocking layer includes, in each of the first, second, and third regions, a plurality of first light blocking portions extending in the first direction, and a plurality of second light blocking portions extending in the second direction. A width of each of the plurality of first light blocking portions in each of the first and second regions is greater than a width of each of the plurality of first light blocking portions in the third region. The first, second, and third regions have substantially the same pixel aperture ratio.

In one embodiment, the width of each of the plurality of second light blocking portions in the third region is greater than the width of each of the plurality of second light blocking portions in each of the first and second regions.

In one embodiment, the first and second substrates are each flexible.

ADVANTAGEOUS EFFECTS OF INVENTION

According to the embodiments of the present invention, a liquid crystal display apparatus can be provided in which the occurrence of color mixture is inhibit even when the liquid crystal display apparatus is curved with a relatively great curvature.

BRIEF DESCRIPTION OF DRAWINGS

FIG. 7(a) is a plan view showing a columnar spacer 31 together with the light blocking layer 5 in the first and second regions R1 and R2, and FIG. 7(b) is a plan view showing a columnar spacer 31 together with the light blocking layer 5 in the third region R3.

FIG. 8 is a diagram showing portions where the measurement of a displacement amount was performed with a liquid crystal panel curved.

FIG. 9 is a graph showing a relationship between a position (coordinate) and a displacement amount in a liquid crystal panel.

FIGS. 12(a), 12(b), and 12(c) are graphs showing example relationships between a coordinate (position) and a width of a first light blocking portion 5a in the display region DR.

FIG. 13 is a diagram showing a style of digital signage in which a flexible liquid crystal panel 900 is wrapped around a circular column 1.

DESCRIPTION OF EMBODIMENTS

Embodiments of the present invention will now be described with reference to the accompanying drawings. Note that the present invention is in no way limited to the embodiments below.

Figure 1:
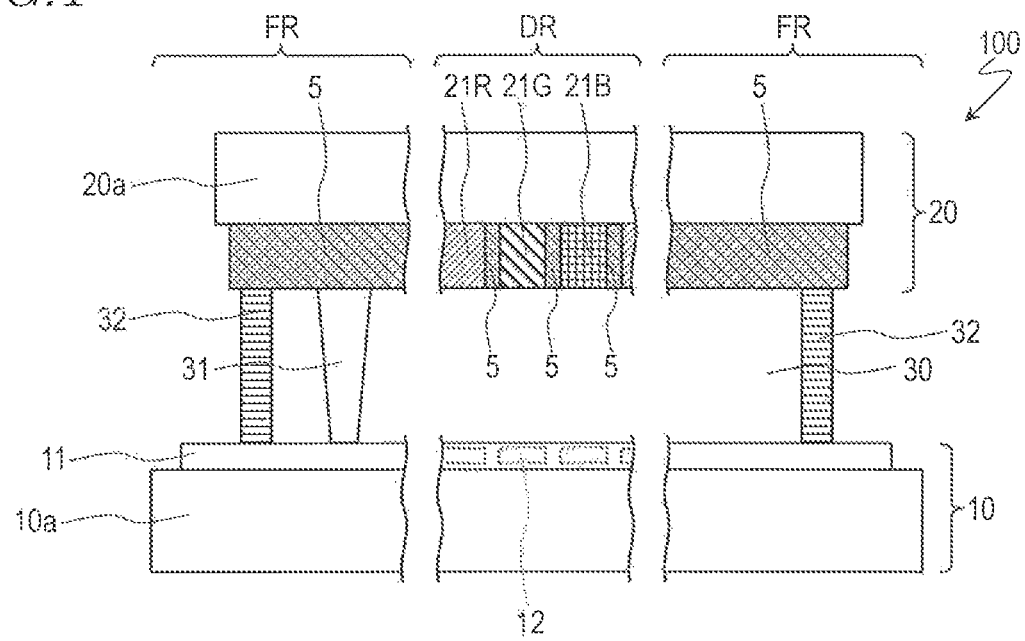
FIG. 1 is a cross-sectional view schematically showing a liquid crystal display apparatus 100 according to an embodiment of the present invention.

A liquid crystal display apparatus 100 according to the present invention will be described with reference to FIG. 1. FIG. 1 is a cross-sectional view schematically showing the liquid crystal display apparatus 100.

As shown in FIG. 1, the liquid crystal display apparatus 100 includes an active matrix substrate (first substrate) 10, a color filter substrate (second substrate) 20 facing the active matrix substrate 10, and a liquid crystal layer 30 provided between the active matrix substrate 10 and the color filter substrate 20.

Figure 2:
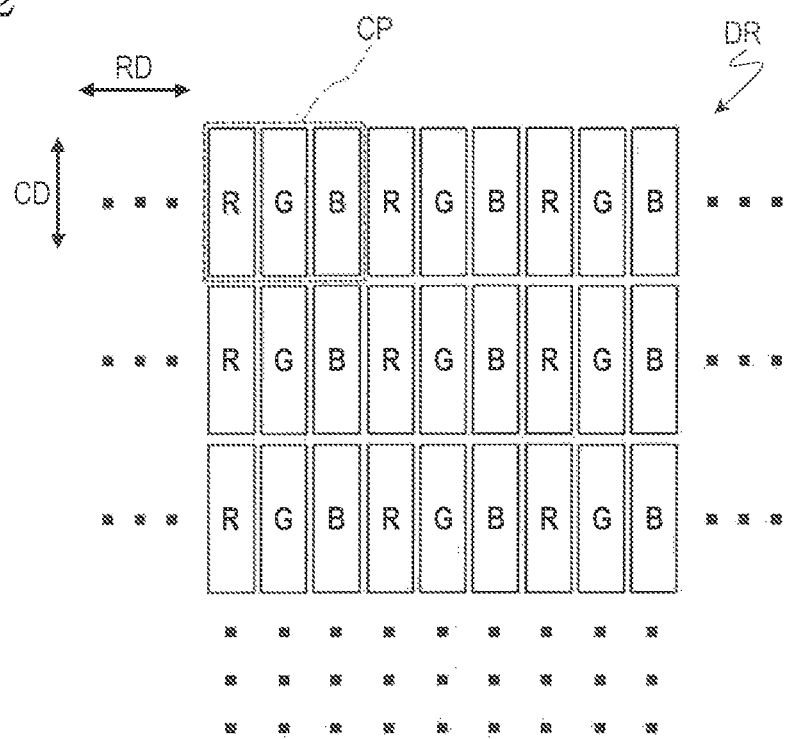
FIG. 2 is a diagram showing a pixel array in a display region DR of the liquid crystal display apparatus 100.

The liquid crystal display apparatus 100 also has a display region DR defined by a plurality of pixels, and a frame region (peripheral region) FR located around the display region DR. FIG. 2 shows an array of the plurality of pixels in the display region DR.

As shown in FIG. 2, the plurality of pixels are arranged in a matrix including a plurality of rows and a plurality of columns (i.e., two-dimensionally in a row direction RD and a column direction CD). In the example of FIG. 2, the plurality of pixels include red pixels R for displaying red, green pixels G for displaying green, and blue pixels B for displaying blue. The three types of pixels, a red pixel R, a green pixel G, and a blue pixel B, form a color display pixel CP.

The active matrix substrate 10 includes an active matrix layer 11. The active matrix layer 11 includes pixel electrodes 12 provided in the respective pixels. The pixel electrode 12 is formed of a transparent conductive material (e.g., ITO). Although not shown herein, the active matrix layer 11 also further includes thin-film transistors (TFTs), scan lines, signal lines, and the like. The TFT is electrically coupled to the pixel electrode 12, and functions as a switching element. The scan line (gate bus line) supplies a scan signal (gate signal) to the TFT, and the signal line (source bus line) supplies a display signal (source signal) to the TFT. The scan line is formed extending in the row direction RD, and the signal line is formed extending in the column direction CD. The active matrix layer 11 is supported by a transparent insulating substrate (e.g., a glass substrate) 10a.

The color filter substrate 20 has a first color filter 21R, a second color filter 21G, and a third color filter 21B of different colors. Specifically, the first color filter 21R, the second color filter 21G, and the third color filter 21B are a red color filter 21R that transmits red light, a green color filter 21G that transmits green light, and a blue color filter 21B that transmits blue light. The red color filter 21R, the green color filter 21G, and the blue color filter 21B are formed of, for example, a photosensitive resin material that is colored (containing a pigment and/or a dye).

Figure 3:
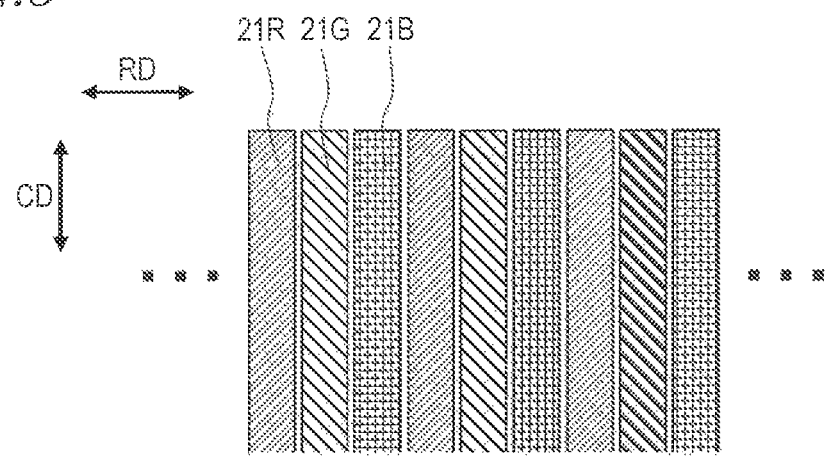
FIG. 3 is a plan view showing an arrangement of a red color filter 21R, a green color filter 21G, and a blue color filter 21B of the liquid crystal display apparatus 100.

FIG. 3 is a plan view showing an arrangement of the red color filter 21R, the green color filter 21G, and the blue color filter 21B. As shown in FIG. 3, the red color filter 21R, the green color filter 21G, and the blue color filter 21B have a striped pattern extending in the column direction CD. That is, the arrangement of the red color filter 21R, the green color filter 21G, and the blue color filter 21B of the color filter substrate 20 is a so-called "striped arrangement."

As shown in FIG. 1, the color filter substrate 20 further has a light blocking layer (also called a "black matrix") 5. The light blocking layer 5 is formed of, for example, a black photosensitive resin material. Alternatively, the light blocking layer 5 may be a layered product of a chromium film and a chromium oxide film.

The light blocking layer 5 includes a portion located in the frame region FR and a portion located in the display region DR. The portion located in the frame region FR of the light blocking layer 5 is formed substantially throughout the frame region FR. The portion located in the display region DR of the light blocking layer 5 is formed in a generally grid pattern.

Although not shown herein, the color filter substrate 20 has a counter electrode facing the pixel electrode 12. The counter electrode is shared by all pixels, and therefore, is also called a common electrode. Note that in some display modes, the common electrode may be provided on the active matrix substrate 10 instead of the color filter substrate 20. The above light blocking layer 5 and the like are supported by a transparent insulating substrate (e.g., a glass substrate) 20a.

As the liquid crystal layer 30, for example, a horizontal alignment-type liquid crystal layer 30 or a vertical alignment-type liquid crystal layer 30 is used, depending on the display mode. In the case where the liquid crystal layer 30 is of the horizontal alignment type, a horizontal alignment film is provided on the surfaces closer to the liquid crystal layer 30 of the active matrix substrate 10 and the color filter substrate 20. Alternatively, in the case where the liquid crystal layer 30 is of the vertical alignment type, a vertical alignment film is provided on the surfaces closer to the liquid crystal layer 30 of the active matrix substrate 10 and the color filter substrate 20.

A plurality of columnar spacers 31 are provided between the active matrix substrate 10 and the color filter substrate 20. The columnar spacer 31 defines a thickness (cell gap) of the liquid crystal layer 30. The columnar spacer 31 is formed of, for example, a photosensitive resin material.

In addition, a seal member 32 is provided between the active matrix substrate 10 and the color filter substrate 20. The seal member 32 is formed of, for example, a UV curable resin material. A liquid crystal material included in the liquid crystal layer 30 is enclosed in a region surrounded by the seal member 32.

In the liquid crystal display apparatus 100 of this embodiment, the active matrix substrate 10 and the color filter substrate 20 are each flexible. The flexibility of the active matrix substrate 10 and the color filter substrate 20 allows the liquid crystal display apparatus 100 to be curved.

In the case where the insulating substrate 10a of the active matrix substrate 10 is a glass substrate, then if the thickness of the glass substrate is smaller (e.g., about 0.15 mm by chemical polishing) than the thickness (about 0.5-0.7 mm) of the glass substrate of a typical liquid crystal display apparatus, the active matrix substrate 10 can be flexible. This is also true of the color filter substrate 20. In order to allow the liquid crystal display apparatus 100 to be curved with a relatively large radius of curvature, the thicknesses of the glass substrates of the active matrix substrate 10 and the color filter substrate 20 are preferably 0.25 mm or less.

Note that in the case where a plastic substrate is used as the insulating substrate 10a of the active matrix substrate 10 and the insulating substrate 20a of the color filter substrate 20, the active matrix substrate 10 and the color filter substrate 20 can also be flexible.

Figure 4:
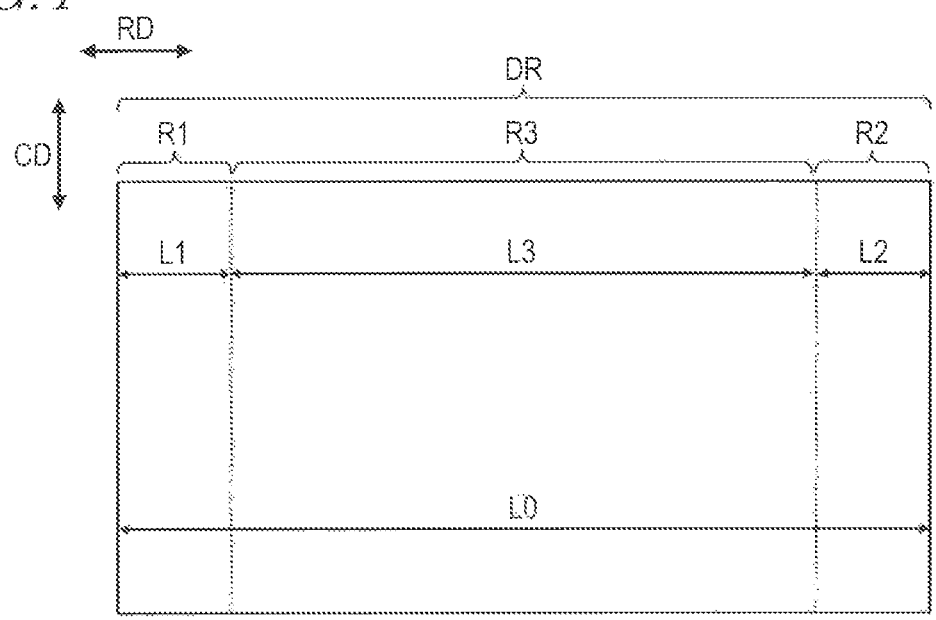
FIG. 4 is a diagram showing a plurality of regions (a first region R1, a second region R2, and a third region R3) included in the display region DR.

As shown in FIG. 4, the display region DR of the liquid crystal display apparatus 100 is divided into a plurality of regions R1, R2, and R3. Specifically, the display region DR includes a first region R1 and a second region R2 that are spaced apart from each other in the row direction RD (a direction substantially perpendicular to the column direction CR), and a third region R3 that is located between the first region R1 and the second region R2, and includes the center of the display region DR.

The first and second regions R1 and R2 are such that when the liquid crystal display apparatus 100 is curved in the row direction RD (i.e., the center line of curvature of the curved surface is parallel to the column direction CD), the amount of a displacement between the active matrix substrate 10 and the color filter substrate 20 in the first and second regions R1 and R2 is significant. In other words, the first and second regions R1 and R2 correspond to the regions MR1 and MR2 of the liquid crystal panel 900 in which color mixture occurs.

Lengths L1 and L2 in the row direction RD of the first and second regions R1 and R2 are smaller than a length L3 in the row direction RD of the third region R3, for example, 10-20% of a length L0 in the row direction RD of the display region DR. In addition, the length L3 in the row direction RD of the third region R3 is, for example, 60-80% of the length L0 in the row direction RD of the display region DR.

In the liquid crystal display apparatus 100 of this embodiment, the configuration of the light blocking layer 5 differ between the first and the second regions R1 and R2 and the third region R3. The configuration of the light blocking layer 5 in each region will now be described with reference to FIGS. 5 and 6.

Figure 5:
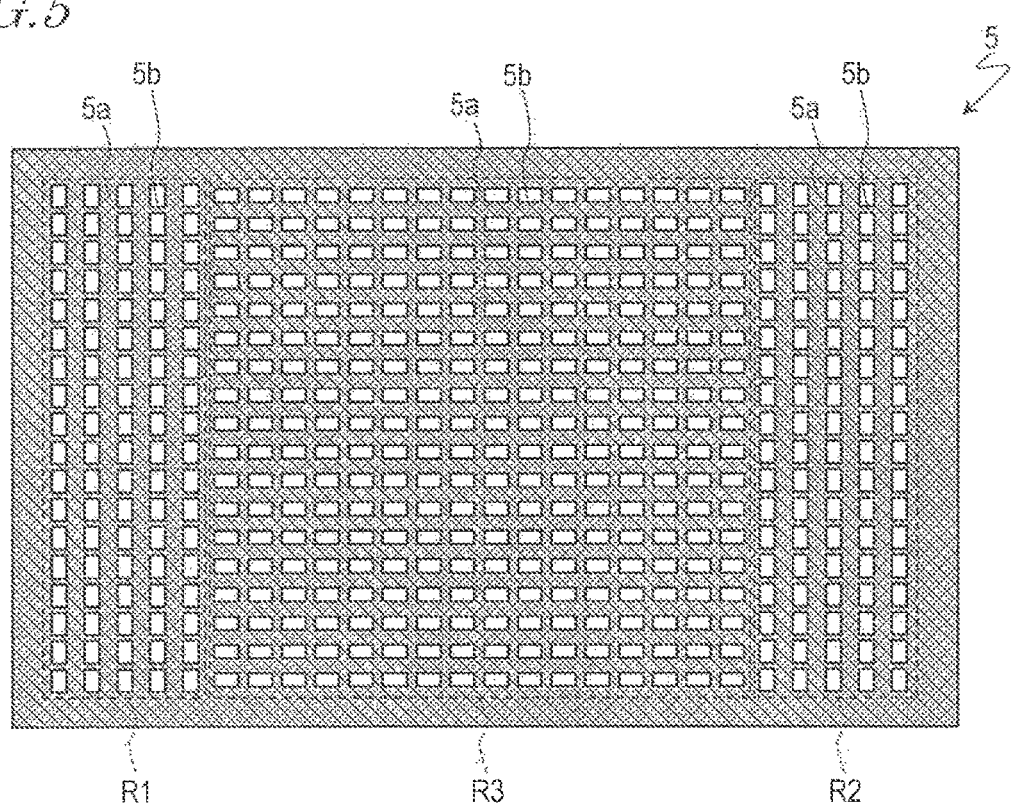
FIG. 5 is a plan view showing an example of a light blocking layer 5 of the liquid crystal display apparatus 100.

FIG. 5 is a plan view showing an example of the light blocking layer 5. FIG. 6(a) is a plan view of the light blocking layer 5 in the first and second regions R1 and R2, and FIG. 6(b) is a plan view showing the light blocking layer 5 in the third region R3.

As already described above, the light blocking layer 5 is formed in a generally grid pattern in the display region DR. Therefore, as shown in FIGS. 5, 6(a), and 6(b), the light blocking layer 5 includes, in each of the first, second, and third regions R1, R2, and R3, a plurality of first light blocking portions (light blocking columns) 5a extending in the column direction CD, and a plurality of second light blocking portions (light blocking rows) 5b extending in the row direction RD.

A region surrounded by two adjacent first light blocking portions 5a and two adjacent second light blocking portions 5b is a region (pixel aperture) of a pixel that contributes to display. Therefore, each first light blocking portion 5a is located between two adjacent pixel columns, and each second light blocking portion 5b is located between two adjacent pixel rows.

As shown in FIG. 6(a), in each of the first and second regions R1 and R2, a width w1 of the first light blocking portion 5a is greater than a width w2 of the second light blocking portion 5b (w1>w2). In contrast to this, as shown in FIG. 6(b), in the third region R3, a width w2' of the second light blocking portion 5b is greater than a width w1' of the first light blocking portion 5a (w2'>w1').

In addition, the width w1 of the first light blocking portion 5a in each of the first and second regions R1 and R2 is greater than the width w1' of the first light blocking portion 5a in the third region R3, and the width w2' of the second light blocking portion 5b in the third region R3 is greater than the width w2 of the second light blocking portion 5b in each of the first and second regions R1 and R2.

The first, second, and third regions R1, R2, and R3 have substantially the same pixel aperture ratio. Specifically, the widths w1 and w1' of the first light blocking portions 5a and the widths w2 and w2' of the second light blocking portions 5b are set so that the pixel apertures have substantially the same area throughout the display region DR.

In addition, in the liquid crystal display apparatus 100 of this embodiment, the first and the second regions R1 and R2, and the third region R3, have different configurations of the columnar spacer 31. The configuration of the columnar spacer 31 in each region will now be described with reference to FIG. 7.

FIG. 7(a) is a plan view showing the columnar spacer 31 together with the light blocking layer 5 in the first and second regions R1 and R2, and FIG. 7(b) is a plan view showing the columnar spacer 31 together with the light blocking layer 5 in the third region R3.

The alignment of liquid crystal molecules is disturbed around the columnar spacer 31 by an alignment regulating force caused by the columnar spacer 31 (more specifically, an alignment regulating force caused by an alignment film formed covering the columnar spacer 31). Therefore, as shown in FIGS. 7(a) and 7(b), the columnar spacer 31 is disposed overlaying the light blocking layer 5.

The plurality of columnar spacers 31 included in the liquid crystal display apparatus 100 of this embodiment include columnar spacers (hereinafter referred to as "first columnar spacers") 31a disposed overlaying the second light blocking portions 5b in each of the first and second regions R1 and R2 as shown in FIG. 7(a), and columnar spacers (hereinafter referred to as "second columnar spacers") 31b disposed overlaying the second light blocking portions 5b in the third region R3 as shown in FIG. 7(b).

An area of the second columnar spacer 31b is greater than an area of the first columnar spacer 31a when they are viewed in a layer normal direction (a direction normal to the display surface) of the liquid crystal layer 30. In other words, the second columnar spacer 31b is larger than the first columnar spacer 31a.

As described above, in the liquid crystal display apparatus 100 of this embodiment, in each of the first and second regions R1 and R2, the width w1 of the first light blocking portion 5a is greater than the width w2 of the second light blocking portion 5b. In other words, in the first and second regions R1 and R2, the first light blocking portion 5a is relatively wide. Therefore, even when the liquid crystal display apparatus 100 is curved in the row direction RD with a relatively great curvature, color mixture is less likely to occur in the first and second regions R1 and R2. Therefore, the decrease in display quality is inhibited.

In addition, in the liquid crystal display apparatus 100, in the third region R3, the width w2' of the second light blocking portion 5b is greater than the width w1' of the first light blocking portion 5a. In other words, in the third region R3, the second light blocking portion 5b is relatively wide. Therefore, in the third region R3, the columnar spacer (second columnar spacer) 31b that is thicker than the columnar spacer (first columnar spacer) 31a of the first and second regions R1 and R2 can be disposed. Therefore, variations in cell gap (the cell gap in the third region R3 becomes smaller than the cell gap in the first and second regions R1 and R2) that occur when the liquid crystal display apparatus 100 is curved in the row direction RD, can be inhibited.

Note that it is considered that even in the case where the first and second light blocking portions 5a and 5b are both formed to be wider than in the prior art throughout the display region DR, the occurrence of color mixture and variations in cell gap can be inhibited. Note that, in that case, the aperture ratio of the entire display region DR is likely to decrease. In contrast to this, in this embodiment, the first light blocking portion 5a is relatively wide in the first and second regions R1 and R2, and the second light blocking portion 5b is relatively wide in the third region R3, and therefore, the occurrence of color mixture and variations in cell gap can be inhibited while the decrease in aperture ratio of the entire display region DR is inhibited. Furthermore, the magnitude relationship between the width of the first light blocking portion 5a and the width of the second light blocking portion 5b is opposite between the first and second regions R1 and R2 and the third region R3, and therefore, the difference in the pixel aperture ratio in the display region DR is more easily reduced. For example, the first region R1, the second region R2, and the third region R3 can have substantially the same pixel aperture ratio.

In addition, in the liquid crystal display apparatus 100, in the third region R3, the width w2' of the second light blocking portion 5b is greater than the width w1' of the first light blocking portion 5a. Conversely, it is considered that even in the case where the width w1' of the first light blocking portion 5a is greater than the width w2' of the second light blocking portion 5b in the third region R3, the columnar spacer (second columnar spacer) 31b that is thicker than the columnar spacer (first columnar spacer) 31a of the first and second regions R1 and R2 can be disposed in the third region R3. Note that, in that case, the adverse influence on the aperture ratio is more significant for the following reason.

As shown in FIG. 2, the color display pixel CP is typically in the shape of a generally square (i.e., the aspect ratio is about 1:1). Therefore, each pixel (each of the red pixel R, the green pixel G, and the blue pixel B) has a shape such that a length thereof in the column direction CD is greater than (e.g., about three times as great as) a length thereof in the row direction RD. Therefore, to increase the width w1' of the first light blocking portion 5a extending in the column direction CD reduces the aperture ratio to a greater extent than to increase the width w2' of the second light blocking portion 5b in the row direction RD. As in this embodiment, by employing the configuration in which the width w2' of the second light blocking portion 5b is greater than the width w1' of the first light blocking portion 5a in the third region R3, a thicker columnar spacer 31b can be disposed while the decrease in aperture ratio is inhibited.

As described above, in the liquid crystal display apparatus 100 of this embodiment, the occurrence of color mixture and variations in cell gap can be inhibited while the decrease in aperture ratio is inhibited. Note that it can be said that such an effect is obtained by the feature that the width w1 of the first light blocking portion 5a in each of the first and second regions R1 and R2 is greater than the width w1' of the first light blocking portion 5a in the third region R3, and the width w2' of the second light blocking portion 5b in the third region R3 is greater than the width w2 of the second light blocking portion 5b in each of the first and second regions R1 and R2.

[Sizes of First and Second Regions]

As already described above, the respective lengths L1 and L2 in the row direction RD of the first and second regions R1 and R2 are, for example, 10-20% in the row direction RD of the display region DR. By employing the configuration of FIGS. 5 and 6 for the light blocking layer 5 in the first and second regions R1 and R2, the occurrence of color mixture can be more reliably prevented.

TABLE 1

|  | Length of longer side | Length of shorter side | Thickness of glass substrate |
|---|---|---|---|
| Color filter substrate | 1338.06 mm | 761.64 mm | 0.15 mm |
| Active matrix substrate | 1340.66 mm | 763.64 mm | 0.15 mm |

FIG. 8 shows portions where the measurement of the displacement amount was performed. The measurement of the displacement amount was performed along a line connecting the center of the right side and the center of the left side of the display region DR (indicated by a dotted line in FIG. 8). In the description that follows, a coordinate on the line is represented by percentage (%). Specifically, the coordinates of the center, right end, and left end of the line are represented by "0%," "100%," and "−100%," respectively.

A relationship between the coordinate and the displacement amount is shown in Table 2, Table 3, and FIG. 9. As can be seen from Table 2, Table 3, and FIG. 9, the displacement amount is great in the region where the coordinate is −95 to −90% and the region where the coordinate is 90 to 95%, and the greatest displacement amount is 13 µm.

TABLE 2

|  | Coordinate [%] | −99% | −95% | −90% | −83% | −75% | −60% | −45% | −30% | −15% | 0% |
|---|---|---|---|---|---|---|---|---|---|---|---|
| Displacement amount [µm] | Measurement First time | −5.5 | −9.6 | −13.0 | −6.8 | −1.8 | −1.7 | −1.7 | 0.2 | 1.3 | 1.6 |
|  | Measurement Second time | −4.1 | −9.9 | −12.7 | −9.7 | −4.9 | −3.1 | 0.1 | −1.5 | −1.4 | 3.0 |

TABLE 3

|  | Coordinate [%] | 15% | 30% | 45% | 60% | 75% | 83% | 90% | 95% | 99% |
|---|---|---|---|---|---|---|---|---|---|---|
| Displacement amount [µm] | Measurement First time | 1.0 | 3.0 | 3.1 | 1.4 | 1.3 | 9.2 | 10.8 | 12.5 | 6.2 |
|  | Measurement Second time | 4.0 | 5.8 | 2.5 | 1.4 | 2.6 | 3.7 | 3.6 | 8.9 | 6.7 |

The result of a measurement of the amount of displacement between substrates that occurred when a liquid crystal display apparatus (liquid crystal panel) was actually curved (also hereinafter referred to as a "substrate displacement amount" or simply a "displacement amount") will now be described.

The measurement of the substrate displacement amount was performed two times with a 60-inch (diagonal: 60 inches) liquid crystal panel curved such that the radius of curvature thereof was 500 mm. The dimensions of the active matrix substrate and the color filter substrate of the liquid crystal panel are as described in Table 1 below. Table 1 describes the length of the longer side, the length of the shorter side, and the thickness of the glass substrate of each of the active matrix substrate and the color filter substrate.

Figure 6:
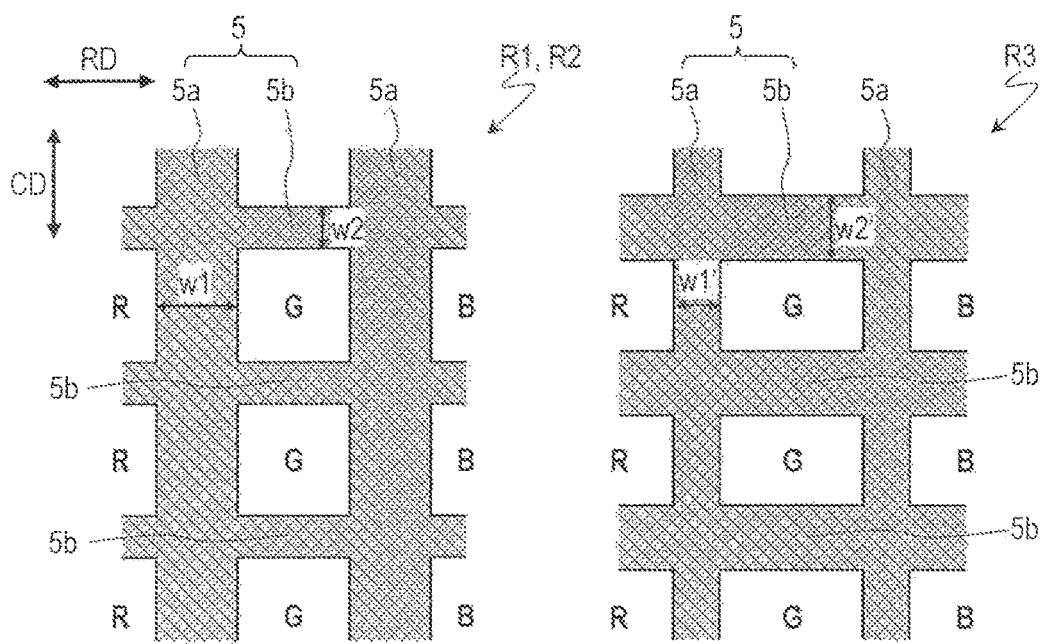
FIG. 6(a) is a plan view of the light blocking layer 5 in the first and second regions R1 and R2.
FIG. 6(b) is a plan view showing the light blocking layer 5 in the third region R3.

As can be inferred from the results shown in FIG. 9 and the like, color mixture occurs in predetermined ranges extending from both ends in the row direction RD of the display region DR. Therefore, by setting the respective lengths L1 and L2 in the row direction RD of the first and second regions R1 and R2 to 10-20% of the length L0 in the row direction RD of the display region DR (i.e., the configuration of FIGS. 5 and 6 is employed in the light blocking layer 5 in this range), the occurrence of color mixture can be more reliably prevented.

[Widths of First and Second Light Blocking Portions]

The width w1 of the first light blocking portion 5a and the width w2 of the second light blocking portion 5b in the first and second regions R1 and R2, and the width w1' of the first light blocking portion 5a and the width w2' of the second light blocking portion 5b in the third region R3, are not particularly limited as long as the above relationship (w1>w2 and w2'>w1') is satisfied.

The width w1 of the first light blocking portion 5a in the first and second regions R1 and R2 are appropriately set so that the occurrence of color mixture is inhibited. In addition, the width w2' of the second light blocking portion 5b in the third region R3 is appropriately set so that light can be blocked from striking the second columnar spacer 31b and its surroudings. The width w2 of the second light blocking portion 5b in the first and second regions R1 and R2, and the width w1' of the first light blocking portion 5a in the third region R3, are appropriately set so that the difference in pixel aperture ratio between the first and second regions R1 and R2 and the third region R3 is reduced (preferably, the first and second regions R1 and R2 and the third region R3 have substantially the same pixel aperture ratio).

[Fourth Region and Fifth Region]

Figure 10:
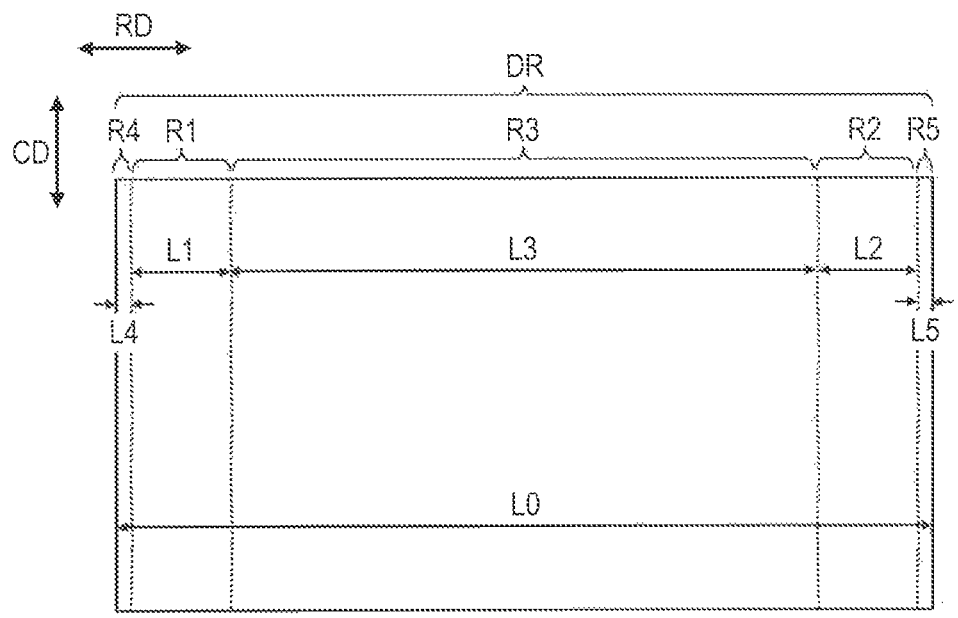
FIG. 10 is a diagram showing another configuration of the display region DR.

FIG. 10 shows another example configuration of the display region DR. In the example of FIG. 10, the display region DR has a fourth region R4 and a fifth region R5 in addition to the first, second, and third regions R1, R2, and R3. The fourth region R4 is located on the opposite side of the first region R1 from the third region R3. Therefore, the first region R1 is located between the third region R3 and the fourth region R4. In addition, the fifth region R5 is located on the opposite side of the second region R2 from the third region R3. Therefore, the second region R2 is located between the third region R3 and the fifth region R5.

In each of the fourth and fifth regions R4 and R5, the width of the first light blocking portion 5a is smaller than or equal to the width of the second light blocking portion 5b. In other words, in the fourth and fifth regions R4 and R5, unlike the first and second regions R1 and R2, the first light blocking portion 5a is not relatively wide.

As shown in FIG. 9, the substrate displacement amount is not very great at or near both ends in the row direction RD of the display region DR (at or near the coordinates of 100% and −100%). This is because these portions are located near the seal member 32 and the displacement itself is inhibited. Therefore, even in the case where the display region DR includes the fourth and fifth regions R4 and R5 as described above, the occurrence of color mixture can be sufficiently inhibited. Respective lengths L4 and L5 in the row direction RD of the fourth and fifth regions R4 and R5 are smaller than the respective lengths L1 and L2 in the row direction RD of the first and second regions R1 and R2, and for example, 5% or less of the length L0 in the row direction RD of the display region DR.

[Width of First Light Blocking Portion in First and Second Regions]

FIG. 5 shows an example in which in each of the first and second regions R1 and R2, the plurality of first light blocking portions 5a have substantially the same width w1 (i.e., equal widths w1). However, the widths w1 may not necessarily be equal to each other. Specifically, in each of the first and second regions R1 and R2, the plurality of first light blocking portions 5a may include two or more first light blocking portions 5a having different widths. An example of the light blocking layer 5 having such a configuration is shown in FIG. 11.

Figure 11:
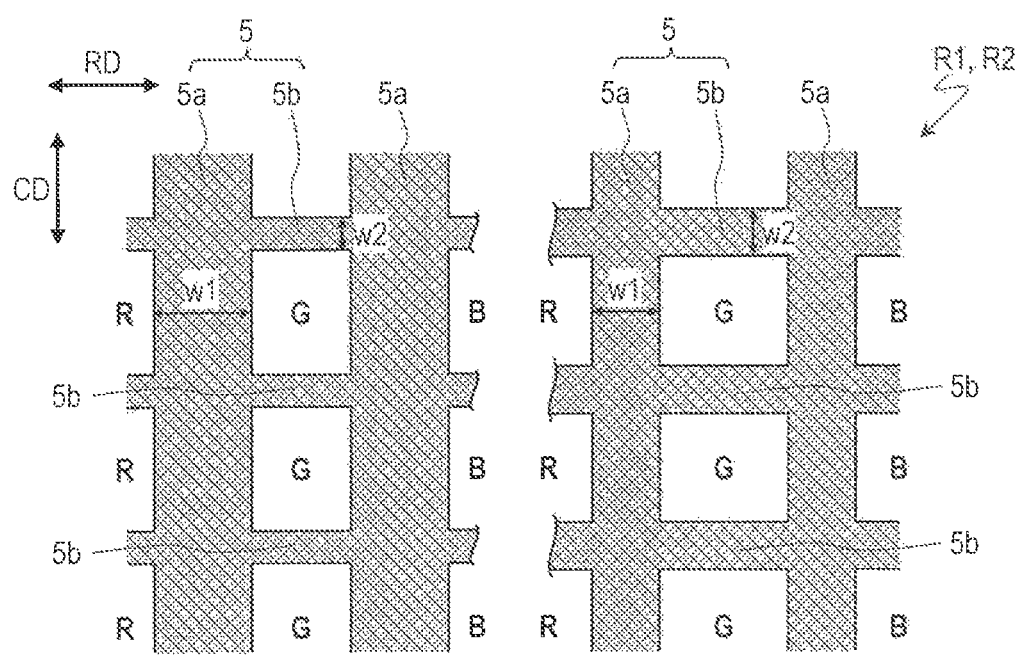
FIG. 11 is a plan view showing an example of another configuration of the light blocking layer 5 in the first region R1.
Figure 14:
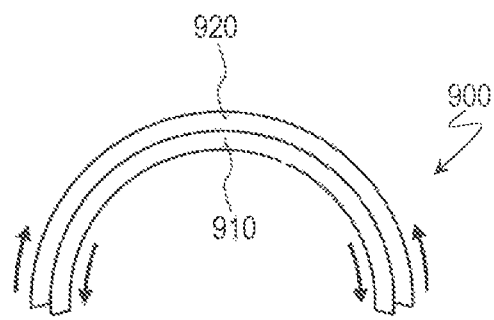
FIG. 14 is a cross-sectional view showing the liquid crystal panel 900 in a curved state.

FIG. 11 shows two regions located at different positions in the row direction RD in the first region R1 (or in the second region R2). As shown in FIG. 11, the width w1 of the first light blocking portion 5a in one of the two regions is different from the width w1 of the first light blocking portion 5a in the other region. In the example shown in FIG. 11, the width w1 of the first light blocking portion 5a shown on the left side is greater than the width w1 of the first light blocking portion 5a shown on the right side. Note that, in both of the regions, the width w1 of the first light blocking portion 5a is greater than the width w2 of the second light blocking portion 5b.

As shown in FIG. 9, the magnitude of the substrate displacement amount varies depending on the position (coordinate) in the row direction RD. Therefore, in each of the first and second regions R1 and R2, by causing the width w1 of the first light blocking portion 5a to have a distribution, the occurrence of color mixture and the decrease in aperture ratio can be more effectively inhibited.

FIGS. 12(a), 12(b), and 12(c) show example relationships between the coordinate (position) and the width of the first light blocking portion 5a in the display region DR. FIGS. 12(a), 12(b), and 12(c) each show a relationship in a region where the coordinate ranges from 50% to 100%.

In each example of FIGS. 12(a), 12(b), and 12(c), the first light blocking portions 5a have equal widths in the third region R3.

In the example of FIG. 12(a), in the second region R2, the width of the first light blocking portion 5a continuously changes depending on changes in the coordinate. In contrast to this, in the examples of FIGS. 12(b) and 12(c), in the second region R2, the width of the first light blocking portion 5a changes stepwise, depending on changes in the coordinate. Thus, in each of the first and second regions R1 and R2, the width of the first light blocking portion 5a may change either continuously or stepwise, depending on the position in the row direction RD.

In the examples of FIGS. 12(a) and 12(c), the fifth region R5 (a region where the first light blocking portion 5a is not relatively wide) is located outward of the second region R2. Thus, the fourth region R4 and the fifth region R5 may be located on the opposite side of the first region R1 from the third region R3 and on the opposite side of the second region R2 from the third region R3, respectively.

Note that the light blocking layer 5 may include other regions in addition to the first and second light blocking portions 5a and 5b in the display region DR. For example, in the case where the TFT is relatively large and is not accommodated in regions covered by the first and second light blocking portions 5a and 5b, the light blocking layer 5 may include a TFT light blocking portion extending from the first light blocking portion 5a and/or the second light blocking portion 5b.

In addition, in the foregoing, an example configuration has been described in which the color display pixel CP includes the red pixel R, the green pixel G, and the blue pixel B, and the color filter substrate 20 has the red color filter 21R, the green color filter 21G, and the blue color filter 21B. The embodiment of the present invention is not limited to this configuration. For example, the color display pixel CP may include at least one of a cyan pixel, a magenta pixel, a yellow pixel, and a white pixel in addition to the red pixel R, the green pixel G, and the blue pixel B. In that case, the color filter substrate 20 may have at least one of a cyan color filter, a magenta color filter, a yellow color filter, and a white color filter in addition to the red color filter 21R, the green color filter 21G, and the blue color filter 21B.

INDUSTRIAL APPLICABILITY

According to an embodiment of the present invention, a liquid crystal display apparatus can be provided in which the occurrence of color mixture is inhibited even when the liquid crystal display apparatus is curved with a relatively great curvature. A liquid crystal display apparatus according to an embodiment of the present invention is suitably used as, for example, digital signage.

REFERENCE SIGNS LIST 5 light blocking layer (black matrix)
5a first light blocking portion
5b second light blocking portion
10 active matrix substrate
10a insulating substrate
11 active matrix layer
12 pixel electrode
20 color filter substrate
20a insulating substrate
21R red color filter
21G green color filter
21B blue color filter
30 liquid crystal layer
31 columnar spacer
32 seal member
R red pixel
G green pixel
B blue pixel
CP color display pixel
DR display region
FR frame region
R1 first region
R2 second region
R3 third region
R4 fourth region
R5 fifth region
100 liquid crystal display apparatus

The invention claimed is:

1. A liquid crystal display apparatus comprising:
a first substrate;
a second substrate facing the first substrate; and
a liquid crystal layer provided between the first and second substrates,
wherein the liquid crystal display apparatus has a display region defined by a plurality of pixels, and
wherein the first substrate has a pixel electrode provided in each of the plurality of pixels,
the second substrate has a first, a second, and a third color filter having different colors and having a striped pattern extending in a first direction, and a light blocking layer,
the display region includes a first and a second region spaced apart from each other in a second direction generally perpendicular to the first direction, and a third region located between the first and second regions and including the center of the display region,
the light blocking layer includes, in each of the first, second, and third regions, a plurality of first light blocking portions extending in the first direction, and a plurality of second light blocking portions extending in the second direction,
in each of the first and second regions, a width of each of the plurality of first light blocking portions is greater than a width of each of the plurality of second light blocking portions, and
in the third region, a width of each of the plurality of second light blocking portions is greater than a width of each of the plurality of first light blocking portions.

2. The liquid crystal display apparatus of claim 1, wherein the first, second, and third regions have substantially the same pixel aperture ratio.

3. The liquid crystal display apparatus of claim 1, wherein a length in the second direction of each of the first and second regions is smaller than a length in the second direction of the third region.

4. The liquid crystal display apparatus of claim 1, wherein a length in the second direction of each of the first and second regions is 10-20% of a length in the second direction of the display region.

5. The liquid crystal display apparatus of claim 1, wherein in each of the first and second regions, the plurality of first light blocking portions have substantially the same width.

6. The liquid crystal display apparatus of claim 1, wherein in each of the first and second regions, the plurality of first light blocking portions include two or more first light blocking portions having different widths.

7. The liquid crystal display apparatus of claim 1, wherein the display region further includes a fourth region located on the opposite side of the first region from the third region, and a fifth region located on the opposite side of the second region from the third region, and
in each of the fourth and fifth regions, a width of each of the plurality of first light blocking portions is smaller than or equal to a width of each of the plurality of second light blocking portions.

8. The liquid crystal display apparatus of claim 7, wherein a length in the second direction of each of the fourth and fifth regions is smaller than a length in the second direction of each of the first and second regions.

9. The liquid crystal display apparatus of claim 1, further comprising:
a plurality of columnar spacers provided between the first and second substrates, and defining a thickness of the liquid crystal layer,
wherein the plurality of columnar spacers include a first columnar spacer disposed overlaying one of the plurality of second light blocking portions in each of the first and second regions, and a second columnar spacer disposed overlaying one of the plurality of second light blocking portions in the third region, and
an area of the second columnar spacer is larger than an area of the first columnar spacer when the first and second columnar spacers are viewed in a layer normal direction of the liquid crystal layer.

10. A liquid crystal display apparatus comprising:
a first substrate;
a second substrate facing the first substrate; and
a liquid crystal layer provided between the first and second substrates,
wherein the liquid crystal display apparatus has a display region defined by a plurality of pixels, and
wherein the first substrate has a pixel electrode provided in each of the plurality of pixels,
the second substrate has a first, a second, and a third color filter having different colors and having a striped pattern extending in a first direction,
the first or second substrate has a light blocking layer,
the display region includes a first and a second region spaced apart from each other in a second direction generally perpendicular to the first direction, and a third region located between the first and second regions and including the center of the display region,
the light blocking layer includes, in each of the first, second, and third regions, a plurality of first light blocking portions extending in the first direction, and a plurality of second light blocking portions extending in the second direction, a width of each of the plurality of first light blocking portions in each of the first and second regions is greater than a width of each of the plurality of first light blocking portions in the third region, and the first, second, and third regions have substantially the same pixel aperture ratio.

11. The liquid crystal display apparatus of claim 10, wherein the width of each of the plurality of second light blocking portions in the third region is greater than the width of each of the plurality of second light blocking portions in each of the first and second regions.

12. The liquid crystal display apparatus of claim 1, wherein the first and second substrates are each flexible.

\* \* \* \* \*